US006396068B1

(12) United States Patent
Sweatt et al.

(10) Patent No.: US 6,396,068 B1
(45) Date of Patent: May 28, 2002

(54) ILLUMINATION SYSTEM HAVING A PLURALITY OF MOVABLE SOURCES

(75) Inventors: William C. Sweatt, Albuquerque, NM (US); Glenn D. Kubiak, Livermore, CA (US)

(73) Assignee: EUV LLC, Livermore, CA (US)

( * ) Notice: Subject to any disclaimer, the term of this patent is extended or adjusted under 35 U.S.C. 154(b) by 15 days.

(21) Appl. No.: 09/678,419

(22) Filed: Oct. 2, 2000

(51) Int. Cl.[7] .............................. G01J 1/00; G21K 5/00; G21G 4/00

(52) U.S. Cl. .......................... 250/504; 378/197; 378/34; 378/35; 378/119

(58) Field of Search ............................ 378/197, 34, 35, 378/84, 85, 119; 355/37; 250/504 R

(56) References Cited

U.S. PATENT DOCUMENTS 4,097,115 A * 6/1978 Garwin et al. ............... 350/6.7
5,307,369 A * 4/1994 Kimberlin ................... 372/108
6,038,279 A * 3/2000 Miyake et al ................. 378/34
6,195,201 B1 * 2/2001 Koch et al. ................. 359/366
6,307,913 B1 * 10/2001 Foster et al. .................. 378/34

* cited by examiner

*Primary Examiner*—Jack Berman
*Assistant Examiner*—Kalimah Fernandez
(74) *Attorney, Agent, or Firm*—Burns, Doane, Swecker & Mathis, LLP

(57) ABSTRACT

An illumination system includes several discharge sources that are multiplexed together to reduce the amount of debris generated. The system includes: (a) a first electromagnetic radiation source array that includes a plurality of first activatable radiation source elements that are positioned on a first movable carriage; (b) a second electromagnetic radiation source array that includes a plurality of second activatable radiation source elements that are positioned on a second movable carriage; (c) means for directing electromagnetic radiation from the first electromagnetic radiation source array and electromagnetic radiation from the second electromagnetic radiation source array toward a common optical path; (d) means for synchronizing (i) the movements of the first movable carriage and of the second movable carriage and (ii) the activation of the first electromagnetic radiation source array and of the second electromagnetic radiation source array to provide an essentially continuous illumination of electromagnetic radiation along the common optical path.

21 Claims, 3 Drawing Sheets

ILLUMINATION SYSTEM HAVING A PLURALITY OF MOVABLE SOURCES

This invention was made with Government support under Contract No. DE-AC04-94AL85000 awarded by the U.S. Department of Energy to Sandia Corporation. The Government has certain rights to the invention.

FIELD OF THE INVENTION

This invention relates generally to the production of extreme ultraviolet radiation and soft x-rays and particularly to a discharge source apparatus for generating extreme ultraviolet radiation for projection lithography.

BACKGROUND OF THE INVENTION

The present state-of-the-art for Very Large Scale Integration ("VLSI") involves chips with circuitry built to design rules of 0.25 μm. Effort directed to further miniaturization takes the initial form of more fully utilizing the resolution capability of presently-used ultraviolet ("UV") delineating radiation. "Deep UV" (wavelength range of $\lambda$=0.3 μm to 0.1 μm), with techniques such as phase masking, off-axis illumination, and step-and-repeat may permit design rules (minimum feature or space dimension) of 0.18 μm or slightly smaller.

To achieve still smaller design rules, a different form of delineating radiation is required to avoid wavelength-related resolution limits. One research path is to utilize electron or other charged-particle radiation. Use of electromagnetic radiation for this purpose will require x-ray wavelengths. Various x-ray radiation sources are under consideration. One source, the electron storage ring synchrotron, has been used for many years and is at an advanced stage of development. Synchrotrons are particularly promising sources of x-rays for lithography because they provide very stable and defined sources of x-rays, however, synchrotrons are massive and expensive to construct. They are cost effective only when serving several steppers.

Another source is the laser plasma source (LPS), which depends upon a high power, pulsed laser (e.g., a yttrium aluminum garnet ("YAG") laser), or an excimer laser, delivering 500 to 1,000 watts of power to a 50 μm to 250 μm spot, thereby heating a source material to, for example, 250,000° C., to emit x-ray radiation from the resulting plasma. LPS is compact, and may be dedicated to a single production line (so that malfunction does not close down the entire plant). The plasma is produced by a high-power, pulsed laser that is focused on a metal surface or in a gas jet. (See, Kubiak et al., U.S. Pat. No. 5,577,092 for a LPS design.)

Discharge plasma sources have been proposed for photolithography. Capillary discharge sources have the potential advantages that they can be simpler in design than both synchrotrons and LPS's, and that they are far more cost effective. Klosner et al., "Intense plasma discharge source at 13.5 nm for extreme-ultraviolet lithography," Opt. Lett. 22, 34 (1997), reported an intense lithium discharge plasma source created within a lithium hydride (LiH) capillary in which doubly ionized lithium is the radiating species. The source generated narrow-band EUV emission at 13.5 nm from the 2-1 transition in the hydrogen-like lithium ions. However, the source suffered from a short lifetime (approximately 25–50 shots) owing to breakage of the LiH capillary.

Another source is the pulsed capillary discharge source described in Silfvast, U.S. Pat. No. 5,499,282, which promised to be significantly less expensive and far more efficient than the laser plasma source. However, the discharge source also ejects debris that is eroded from the capillary bore and electrodes. An improved version of the capillary discharge source covering operating conditions for the pulsed capillary discharge lamp that purportedly mitigated against capillary bore erosion is described in Silfvast, U.S. Pat. No. 6,031,241.

Debris generation and high-power operation remain two of the most significant impediments to the successful development of the capillary plasma discharge sources in photolithography. Debris generated by the capillary tends to coat optics used to collect the EUV light which severely affects their EUV reflectance. High power is required to achieve adequate wafer throughput and low cost of ownership. Ultimately, this will reduce their efficiency to a point where they must to be replaced more often than is economically feasible. The art is in search of EUV radiation sources that do not generate significant amounts of debris.

SUMMARY OF THE INVENTION

The invention is based in part on the recognition that using of several discharge sources that are multiplexed together in time can significantly reduce the amount of debris generated. It is expected that with inventive radiation source, the peak discharge source temperature will be lower than it would be if a single discharge source were used in continuous operation so the debris production will be less.

In one embodiment, the invention is directed to an illumination system that includes:

(a) a first electromagnetic radiation source array that includes a plurality of first activatable radiation source elements that are positioned on a first movable carriage;

(b) a second electromagnetic radiation source array that includes a plurality of second activatable radiation source elements that are positioned on a second movable carriage;

(c) means for directing electromagnetic radiation from the first electromagnetic radiation source array and electromagnetic radiation from the second electromagnetic radiation source array toward a common optical path; and (d) means for synchronizing (i) the movements of the first movable carriage and of the second movable carriage and (ii) the activation of the first electromagnetic radiation source array and of the second electromagnetic radiation source array to provide an essentially continuous illumination of electromagnetic radiation along the common optical path.

DESCRIPTION OF PREFERRED EMBODIMENTS

Figure 1:
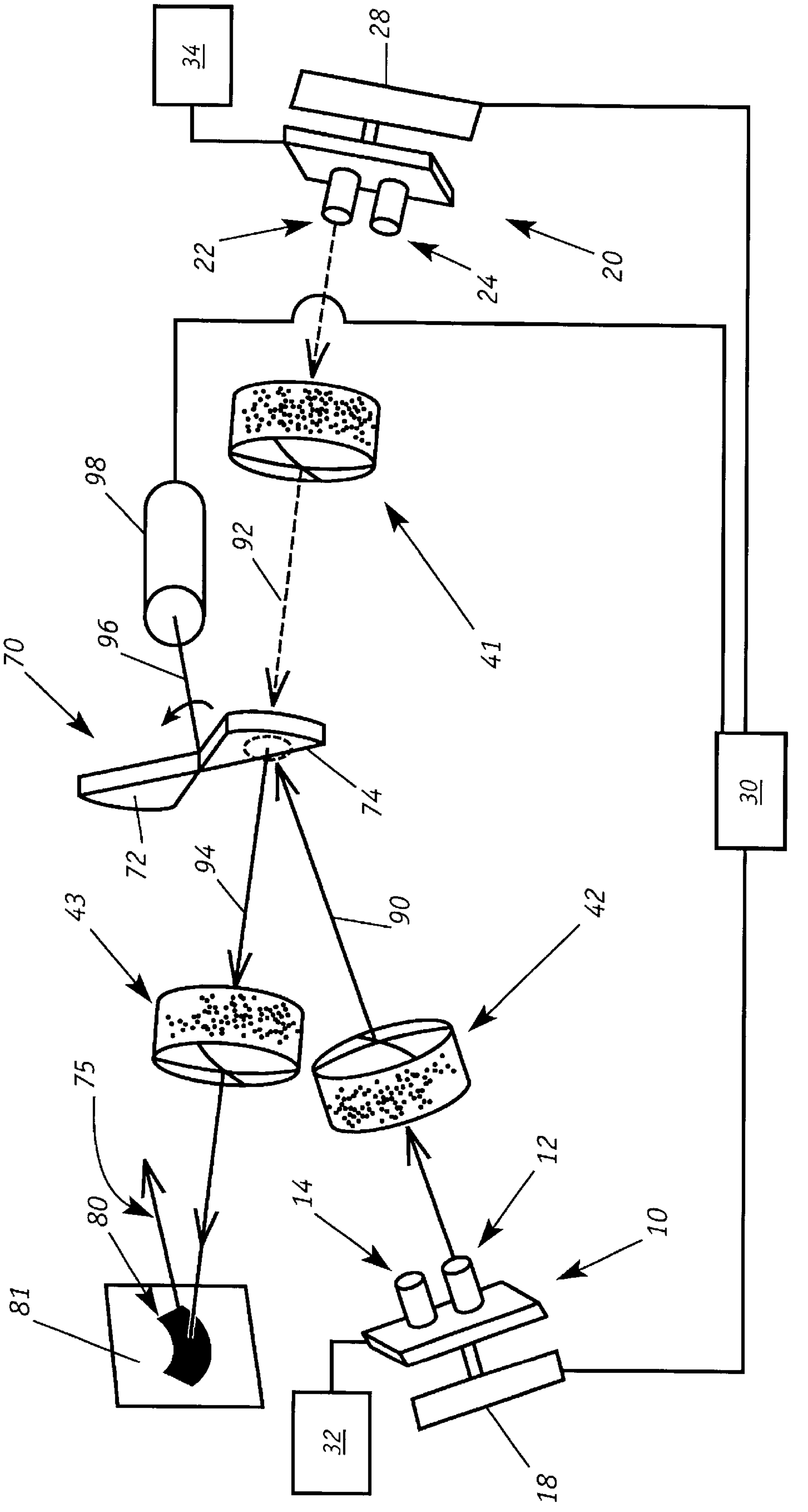
FIG. 1 illustrates an embodiment of multiplex illumination system of the present invention.

FIG. 1 depicts a multiplex illumination system that is particularly suited for generating extreme ultraviolet radiation that typically has a wavelength in the range of about 6 to 30 nm, for use in EUV photolithography. While the invention will be illustrated employing discharge sources, it is understood that other sources of radiation that can be activated and deactivated can be used. As illustrated, the system includes two translating cassettes 10 and 20, however, it is understood that more than two cassettes can be employed. Each cassette preferably contains at least two and typically two to four discharge sources although more can be employed. Preferably the number of discharge sources in cassette 10 is the same as that in cassette 20 although it is not necessary. Moreover, each cassette could move in a rotating motion rather than a linear motion as shown.

In this illustrative embodiment, each cassette has two discharge sources; cassette 10 has discharge sources 12 and 14 and cassette 20 has discharge sources 22 and 24. As described further herein, each source moves by its cassette between two fixed positions: (1) an illuminating position and (2) a non-illuminating position. With respect to cassette 10, discharge source 12 is shown be to in the illuminating position and discharge source 14 is shown be in the non-illuminating position. Similarly, with respect to cassette 20, discharge source 22 is shown be to in the illuminating position and discharge source 24 is shown be in the non-illuminating position. The system also includes a rotating beam combiner 70 which includes mirrors that reflect radiation from one of the discharge sources from cassette 10 toward a desired optical path. In addition, when rotated to an unobstructing position, the rotating beam combiner allows passage of a beam of radiation from one of the discharge sources from cassette 20 also toward essentially the desired optical path. As further described herein, the beam combiner 70 includes two facets 72, 74 which are preferably symmetrical. The front surface of each facet that faces cassette 10 is a reflective surface and the back surface is made of a non-transparent material. Preferably, both facets 72, 74 and both open areas are each 90°. The rotating beam combiner 70 is attached to rotating shaft 96 that is engaged to motor 98.

The cassettes 10 and 20 are mounted on stages 18 and 28, respectively, which have rapid translation control. For applications such as EUV photolithography where the radiation sources must be placed in vacuum, the stages are preferably in-vacuum motor actuated or manually actuated with vacuum feed-throughs. Rapid precision stage assemblies are known in the art and are as described, for example, in U.S. Pat. Nos. 5,623,853 and 5,699,621 which are incorporated herein by reference. To facilitate heat removal, cassettes 10 and 20 are connected to sources of coolant (e.g., water) 32 and 34, respectively. Coolant is circulated to dissipate heat generated by the discharge sources.

The movements of the rotating beam combiner 70 and translating cassettes 10, 20 are synchronized by computer 30. It will be appreciated that the speed and timing of the movements will depend on, among other things, the specific configuration of the facets of the combiner and the number of discharge sources in each cassette. A primary consideration is that the discharge sources operate for short durations to prevent excessive heat build-up and debris generation.

As illustrated, the system may further include optical elements (e.g, focusing or flat mirrors or diffractive elements) that are collectively depicted as optical elements 41, 42 and 43 that direct the radiation from the two translating cassettes 10 and 20 along a desired optical path. In one preferred embodiment, the optical elements. are part of a condenser of a photolithography system. In one embodiment, optical elements 41 and 43 working together represents a collection of mirrors whereby a beam cross section is reflected from a surface of one of the mirrors to form a curved slit illumination 80 on moving mask 81. Beam 75 is propagated from the reflective mask 81 into a camera (not shown) before being directed on a wafer (not shown).

To provide uniform temporal illumination, a preferred sequence of operation is as follows: Referring to FIG. 1, discharge source 12 on the cassette 10 is in the "on" position and the beam combiner 70 is rotated such that mirror segment 74 reflects beam 90 toward optical element 43. The beam combiner 70, which is preferably continuously rotated by shaft 96 which is engaged to motor 98, eventually moves to a position wherein mirror segment 74 is out of the way so that discharge source 22 on the cassette 20 can illuminates the camera. Specifically, discharge source 22 of cassette 20 "comes on" when mirror 74 allows some of its radiation into the common optical path. Discharge source 12 of cassette 10 "goes off" when mirror 74 is completely out of the way allowing beam 92 to completely fill the aperture defined by the common optical path. Cassette 10 can now shift so that discharge source 12, which is deactivated, moves to the non-illuminating position. In doing so, discharge source 14 which is ready to become activated moves into the illuminating position. As the beam combiner 70 continues to rotate, and the other mirror segment 72 starts cutting off the light beam 92 from the cassette 20. The discharge source 22 of cassette 20 turns off when this is complete and moves into the non-illuminating position and discharge source 14 of cassette 10 turns on and moves into the illuminating position. This cycle repeats itself to provide a quasi-continuous source of light (e.g, EUV) while reducing the power load and resulting temperature increase on each individual discharge source to reduce debris.

Figure 2A:
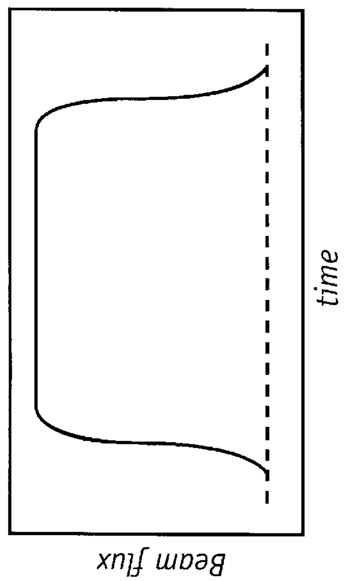
FIG. 2A is a graph of beam flux vs. time for a pulse from a discharge source.

FIG. 2A shows the typical pulse shape of a discharge source which has a mesa configuration wherein the beam flux is relatively uniform over a period of time. The time duration is selected to be short enough so that the temperature of the discharge source does not reach critical temperatures that lead to material failure or generation of significant amounts of debris. The number of sources per cassette is chosen to be large enough so that each source can be off long enough to cool down.

Figure 2B:
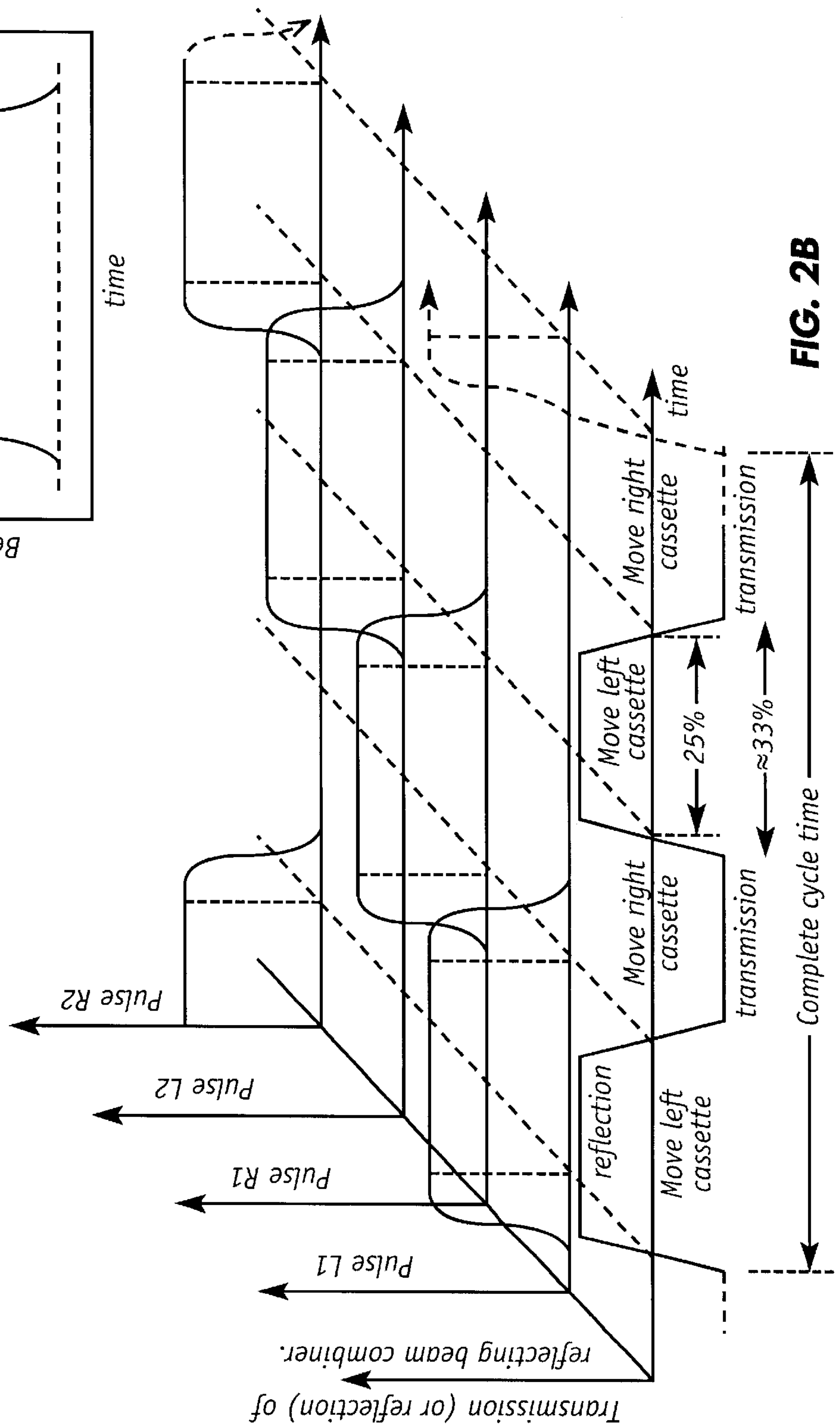
FIG. 2B is a graph beam flux and transmission of the reflecting beam combiner mirror vs. time showing the timing sequence for four sources, movement of the source cassettes and rotating mirror of a muliplex illumination system.

FIG. 2B is a graph that depicts the (1) timing sequence for the four discharge sources of multiplex illumination system of FIG. 1, (2) movement of the two cassettes, (3) movement of the rotating mirror, and (4) overall beam flux (i.e, intensity) contributed by the discharge sources. Discharge sources 12 and 14 of cassette 10 are designated "L1" and "L2", respectively, and discharge sources 22 and 24 of cassette 20 are designated "R1" and "R2", respectively.

Figure 3:
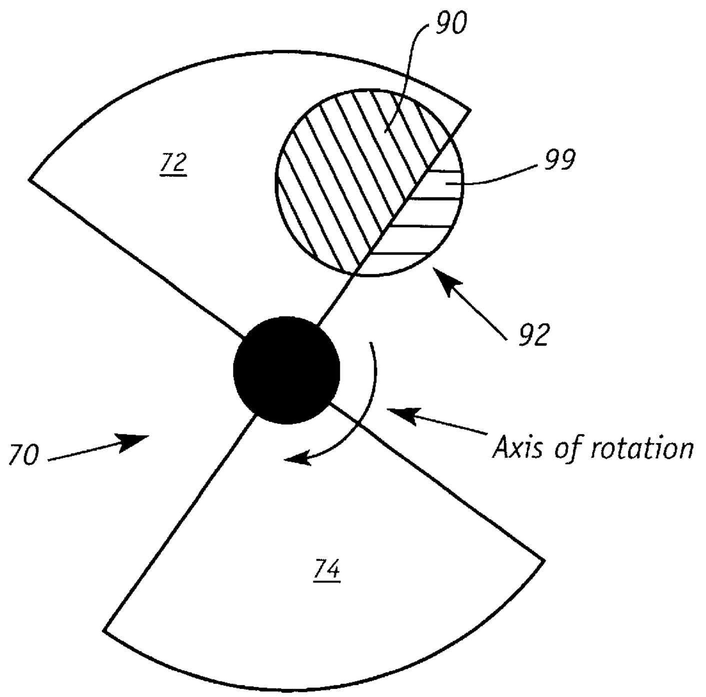
FIG. 3 illustrates the front view of a beam combiner mirror.

In this representation, the illumination is initially contributed by discharge source R2 followed in sequence by discharge sources L1, R1, and L2. In this fashion, the beam flux of beam 94 (FIG. 1) would be represented by a horizontal line which is formed by the aggregate mesa configurations (FIG. 2A) of the four discharge sources. The graph of FIG. 2B also depicts the transmission (or reflection) of the reflecting beam combiner 70 (FIGS. 1 and 3). It is expected that if the beam footprint at the beam combiner were vanishingly small, then the duty cycle of each of the four discharge sources would be 25%. With a finite beam spot size, it is expected that the duty cycle will be more like 33%. The time overlap allows the illumination reaching the camera to remain constant during the hand-off from one cassette to the other.

FIG. 3 shows the front view of beam combiner 70 during the transition from the right cassette 20 to the left cassette 10. Each mirror facet 72,74 preferably has a surface area covering about a quadrant (i.e., quarter of a circle). Light beam 99 is partially formed from beam 90, that is generated by discharge source 14 of cassette 10, as it is reflected from facet 72 and partially from beam 92 that is generated by discharge source 22. As is apparent, both sources are operating during the transition so that the flux reaching the camera stays at full strength.

Figure 4:
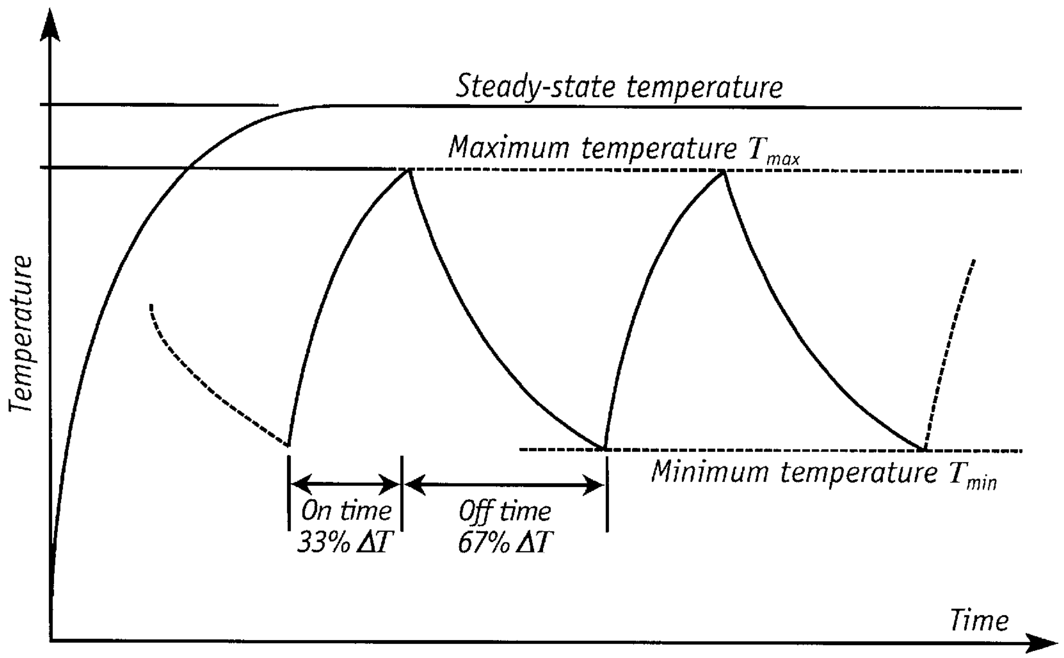
FIG. 4 is a graph of temperature of discharge source vs. time.

For the configuration illustrated which has four discharge sources, each discharge would need to be activated for about 33% of the complete cycle time. Thus while as each discharge source will heat up, the individual discharge source would not be on long enough to reach its steady-state temperature. FIG. 4 illustrates this phenomenon. As shown, a discharge source heats up while it is "on" (for a third of the cycle) and then cools for the rest of the cycle. During the "off" time, the discharge source will to cool to a minimum temperature but typically not down to the ambient temperature. The upper curve shows the steady-state temperature that the discharge source would reach if it were left on infinitely. The saw tooth shaped curve represents the expected temperature history if the discharge source were on for about 33% of the total cycle time and off for the remaining 67%.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. An illumination system comprising:

(a) a first electromagnetic radiation source array that includes a plurality of first activatable radiation sources that are positioned on a first movable carriage;

(b) a second electromagnetic radiation source array that includes a plurality of second activatable radiation sources that are positioned on a second movable carriage;

(c) means for directing electromagnetic radiation from the first electromagnetic radiation source array and electromagnetic radiation from the second electromagnetic radiation source array toward a common optical path; and (d) means for synchronizing (i) the movements of the first movable carriage and of the second movable carriage and (ii) the activation of the first electromagnetic radiation source array and of the second electromagnetic radiation source array to provide an essentially continuous illumination of electromagnetic radiation along the common optical path.

2. The illumination system of claim 1 wherein each of the plurality of first activatable radiation source is a discharge plasma source and each of the plurality of the second activatable radiation source is a discharge plasma source.

3. The illumination system of claim 1 wherein the means for directing electromagnetic radiation comprises at least one mirror facet that moves in and out of the optical path wherein the at least one mirror facet comprises a front reflective surface.

4. The illumination system of claim 3 wherein the front reflective surface of the at least one mirror facet directs radiation from the first electromagnetic radiation source array to the common optical path.

5. The illumination system of claim 3 wherein the front reflective surface of the at least one mirror facet directs part of the radiation from the first electromagnetic radiation source array along a first optical path and the back surface of the at least one mirror facet partially blocks radiation from the second electromagnetic radiation source array while the remainder of the radiation that is not blocked is moves along a second optical path that is approximately parallel to the first optical path wherein the sum of the electromagnetic radiation from the first and second electromagnetic radiation sources is approximately equal in power and cross section to that of the electromagnetic radiation from the second electromagnetic radiation source alone when it is not blocked by the at least one mirror facet.

6. The illumination system of claim 3 wherein the at least one mirror facet mounted on a rotating device that rotates the at least one mirror facet in and out of the first optical path.

7. The illumination system of claim 6 wherein the synchronizing means includes means for controlling the rotational speed of the at least one mirror facet.

8. The illumination system of claim 1 the first and second electromagnetic radiation source arrays generate radiation in the wavelength range between about 6 nm to 30 nm.

9. The illumination system of claim 1 further comprising means for removing heat from the first electromagnetic radiation source array and from the second electromagnetic radiation source array.

10. The illumination system of claim 1 further comprising a collection optics that collects radiation from the second radiation source and directs it to the common optical path.

11. The illumination system of claim 1 further comprising a collection optics that collects radiation from the first radiation source and directs it to the common optical path.

12. The illumination system of claim 11 further comprising at least one optical element that relays the radiation from the first radiation source array to a lithography camera.

13. A method of continuously generating a beam of radiation that comprises the steps of:

(a) providing an illumination system that comprises:

(i) a first electromagnetic radiation source array that includes a plurality of first activatable radiation sources that are positioned on a first movable carriage; and (ii) a second electromagnetic radiation source array that includes a plurality of second activatable radiation sources that are positioned on a second movable carriage;

(c) directing electromagnetic radiation from the first electromagnetic radiation source array and electromagnetic radiation from the second electromagnetic radiation source array toward a common optical path; and (d) synchronizing (i) the movements of the first movable carriage and of the second movable carriage and (ii) the activation of the first electromagnetic radiation source array and of the second electromagnetic radiation source array to provide an essentially continuous illumination of electromagnetic radiation along the common optical path.

14. The method of claim 13 wherein each of the plurality of first activatable radiation source is a discharge plasma source and each of the plurality of the second activatable radiation source is a discharge plasma source.

15. The method of claim 13 wherein the step of directing electromagnetic radiation employs at least one mirror facet that moves in and out of the optical path wherein the at least one mirror facet comprises a front reflective surface and a back surface that is non-transparent.

16. The method of claim 15 wherein the front reflective surface of the at least one mirror facet directs radiation from the first electromagnetic radiation source array to the common optical path.

17. The method of claim 15 wherein the front reflective surface of the at least one mirror facet directs part of the radiation from the first electromagnetic radiation source array along a first optical path and the back surface of the at least one mirror facet partially blocks radiation from the second electromagnetic radiation source array while the remainder of the radiation that is not blocked is moves along a second optical path that is parallel to the first optical path.

18. The method of claim 15 wherein the at least one mirror facet mounted on a rotating device that rotates the at least one mirror facet in and out of the first optical path.

19. The method of claim 18 wherein the synchronizing step controls the rotational speed of the at least one mirror facet.

20. The method of claim 13 wherein the first and second electromagnetic radiation source arrays generate radiation having a wavelength that ranges from about 6 nm to 30 nm.

21. The method of claim 13 further comprising the step of removing heat from the first electromagnetic radiation source array and from the second electromagnetic radiation source array.

* * * * *